United States Patent [19]

Marland

[11] Patent Number: 4,807,285
[45] Date of Patent: Feb. 21, 1989

[54] METHOD AND APPARATUS FOR SCRAMBLING A TELEVISION SIGNAL

[75] Inventor: Dale W. Marland, Canastota, N.Y.

[73] Assignee: Eagle Comtronics, Inc., Clay, N.Y.

[21] Appl. No.: 370,842

[22] Filed: Apr. 23, 1982

[51] Int. Cl.[4] .......................................... H04N 7/167
[52] U.S. Cl. ........................................ 380/15; 380/17
[58] Field of Search ................... 358/120, 124; 380/15, 380/17

[56] References Cited

U.S. PATENT DOCUMENTS

| | | | |
|---|---|---|---|
| 3,813,482 | 5/1974 | Blonder | 358/120 |
| 4,012,093 | 3/1977 | Crane . | |
| 4,064,536 | 12/1977 | Saeki et al. . | |
| 4,084,870 | 4/1978 | Laserson et al. . | |
| 4,163,252 | 7/1979 | Mistry et al. . | |
| 4,163,253 | 7/1979 | Morio et al. . | |
| 4,222,068 | 9/1980 | Thompson . | |
| 4,290,661 | 9/1981 | Burns . | |
| 4,319,273 | 3/1982 | Nossem | 358/120 |
| 4,338,628 | 7/1982 | Payne et al. . | |

Primary Examiner—Stephen C. Buczinski
Attorney, Agent, or Firm—Parkhurst, Oliff & Berridge

[57] ABSTRACT

An in-band television signal scrambling method and apparatus are disclosed which employ a scrambler which receives and scrambles a television signal by suppressing the amplitude of the horizontal synchronizing signals contained therein to a point below the "black" level and which generates whiter-than-white timing pulses in the scrambled television signal for use by a descrambler in reconstructing the suppressed amplitude horizontal synchronizing signals, and one or more descramblers for detecting the whiter-than-white timing pulses in the scrambled television signal and generating therefrom switching signals for a switchable attenuator through which the scrambled television signal passes. The attenuator boosts the amplitude of the suppressed amplitude horizontal synchronizing signals relative to the remainder of the scrambled television signal, thereby restoring the scrambled television signal to an unscrambled condition.

43 Claims, 4 Drawing Sheets

FIG. 1 SCRAMBLER

FIG. 2 DESCRAMBLER

FIG. 3
PLUG-IN MODULE

FIG. 4B
SYNC SUPPRESS
PULSES TO
ATTENUATOR (A)

FIG. 4C
W/W PULSE TO
ATTENUATOR (B)

FIG. 4D

METHOD AND APPARATUS FOR SCRAMBLING A TELEVISION SIGNAL

CROSS REFERENCE TO RELATED APPLICATION

This application contains subject matter which is related to subject matter described and claimed in copending application Ser. No. 370,841, entitled "Method And Apparatus For Identifying And Rendering Operative Particular Descramblers In A Television Signal Scrambling System", filed on even date herewith and assigned to the same assignee as the present application.

BACKGROUND AND SUMMARY OF THE INVENTION

The present invention relates to a television signal scrambling method and apparatus which employ a scrambler for scrambling a television signal and a descrambler for restoring the scrambled television signal to its original unscrambled form.

Scrambling systems are well known in the art and are often employed in cable and other subscription TV systems for assuring that only paid subscribers receive the television signal transmissions to which they subscribe. A paid subscriber is provided with an authorized descrambler for unscrambling a scrambled television signal so that his television receiver may properly process the unscrambled television signal and allow unimpeded reception. Non-subscribers, who do not have the appropriate descrambling equipment, will only receive the scrambled television signal which cannot be properly processed to produce an acceptable video and/or audio output.

All scrambling systems seek to provode an unintelligible video and/or audio signal to an unauthorized recipient which cannot be easily defeated or unscrambled without the proper descrambling equipment. The greater the sophisication of the scrambling provided, the more difficult it is for unauthorized recipients to replicate authorized descrambling equipment. However, as the sophistication of the scrambling technique increases, so does the cost of the associated scrambler and descrambler circuitry. Moreover, the more complex the circuit, the less reliable it becomes.

Several scrambling systems have been implemented using the concept of suppression of the horizontal or vertical synchronizing signals which are present in a transmitted television signal. In such systems, additional signals must be transmitted from the scrambler to the descrambler to cue the descrambler so that it can reconstruct the suppressed amplitude synchronizing signals. Systems using this approach use the sound carrier or other subcarriers to carry the timing information used to reconstruct the suppressed amplitude synchronizing signals. This requires the provision of additional circuits for generating additional subcarriers or for modulating the sound carrier or chroma sub-carrier which adds increased complexity and cost to the overall scrambling system. In addition, when the sound carrier is used to carry the timing information its level becomes critical and in some instances the scrambling system can become unuseable.

The present invention has been designed to overcome the above problems typically associated with scrambling systems. Accordingly, one object of the invention is the provision of a relatively inexpensive, yet highly reliable, scrambling method and apparatus employing a scrambler which scrambles an incoming television signal by suppressing the amplitude of the horizontal synchronizing signals contained therein. The scrambler also impresses whiter-than-white timing pulses on the scrambled television signal which are used by a descrambler to reconstruct the suppressed amplitude horizontal synchronizing signals thereby unscrambling the television signal. The scrambled television signal and whiter-than-white timing pulses impressed thereon occupy the same signal bandwidth as an unscrambled television signal.

An additional object of the invention is the provision of a scrambling method and apparatus in which the timing pulses required by the descrambler to reconstruct the suppressed amplitude horizontal synchronizing signals are transmitted without requiring use of a sound carrier or other subcarriers.

An additional object of the invention is the provision of a scrambling method and appratus employing a descrambler which is capable of descrambling a scrambled television signal containing suppressed amplitude horizontal synchronizing signals and whiter-than-white reconstruction timing pulses.

These and other objects, features and advantages of the invention will become more readily apparent from the following description of the invention which is provided in conjunction with the attached drawings.

DETAILED DESCRIPTION OF THE INVENTION

The present invention provides a scrambling method and apparatus employing a scrambler and descrambler in which the horizontal synchronizing pulses of an incoming television signal to the scrambler are reduced to an amplitude level below the "black" level of the video portion of the television signal. This effectively eliminates the horizontal synchronizing pulses and achieves a scrambling of the television signal. As well known, without horizontal synchronizing pulses, a television receiver cannot properly reconstruct an iamge on a picture tube. In order to allow descramblers on an opposite end of the scrambling system to reconstruct the suppressed amplitude horizontal synchronizing pulses, the scrambler adds timing pulses to the scrambled television signal which cue the descramblers so that they properly reconstruct the suppressed amplitude horizontal synchronizing pulses and thereby unscramble the scrambled television signal. The timing pulses occur as whiter-than-white pulses within the scrambled television signal which are detected in the descramblers and used to boost the amplitude of the suppressed amplitude horizontal synchronizing pulses relative to the amplitude of the remainder of the scrambled television signal to restore the horizontal synchronizing pulses to their original amplitude level. By this operation, the descrambler recreates the unscrambled television signal for use by a television receiver.

Before describing specific structures which implement the method and apparatus aspects of the invention, brief reference will be made to FIGS. 4a . . . 4d which illustrate, by signal waveform, the operation of a scrambling system constructed in accordance with the teachings of the invention.

Figure 4A:
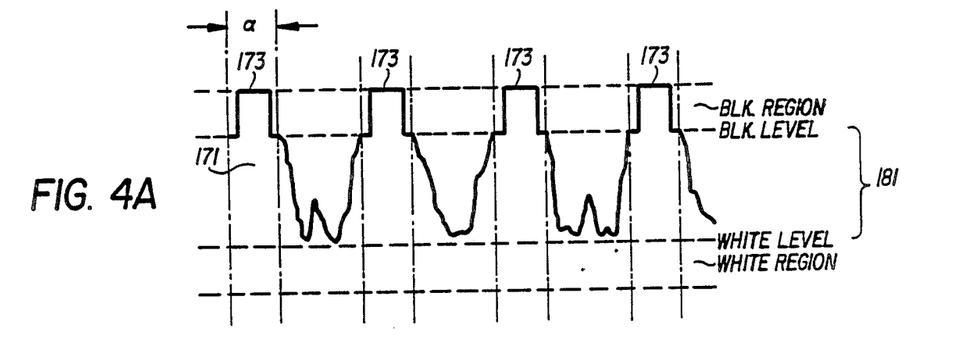
FIGS. 4a, 4b, 4c and 4d illustrate signal waveforms useful in understanding the operation of the invention; and, FIG. 5 illustrates a representative switchable attenuator which may be used in FIGS. 1 and 2.

FIG. 4a illustrates the first four horizontal lines of a television signal following a vertical interval; that is, at the start of a field. As shown in FIG. 4a, the horizontal synchronizing pulses 173 occur, during a horizontal retrace interval "a", in a blacker-than-black region above the "black" level of a video information signal 171 which varies within an amplitude range 181. FIG. 4a also illustrates a "white" level which defines the other boundary of the video amplitude level range 181. In the invention, the amplitude of the horizontal synchronizing pulses 173 are suppressed to a level which falls below the "black" level, that is, into the amplitude range 181 of the picture information signal so that the horizontal synchronizing signals have an amplitude level below that required for a receiver to detect them, as illustrated in FIG. 4d.

Figure 4B:
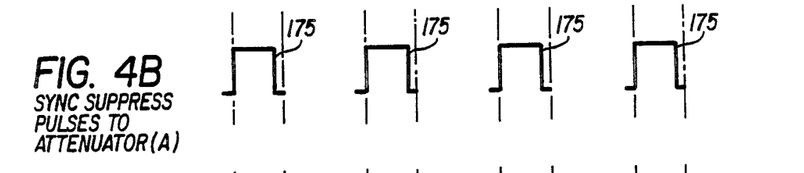
Figure 4C:
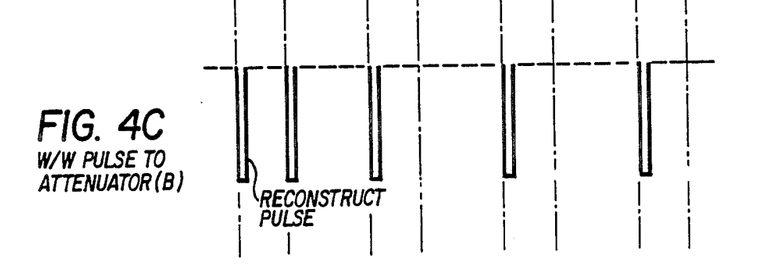
Figure 4D:
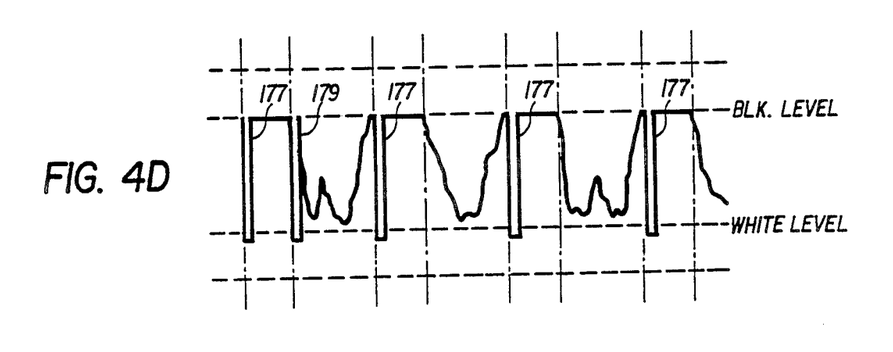

The reconstruction timing signals which are impressed on the scrambled television signal are also illustrated as 177 in FIG. 4d. These signals occur as short duration, e.g. 2 μs, whiter-than-white pulses adjacent or within the time interval which would normally be occupied by a horizontal synchronizing signal pulse 173. A whiter-than-white pulse is one which has an amplitude lower than the "white" level of the normal picture amplitude range 181, making it easily discernible by a descrambler. Preferably, and as shown in FIG. 4d, the whiter-than-white pulses occur on the front porch preceding the suppressed amplitude horizontal synchronizing pulses.

The scrambling system as described may be used in conjunction with a tier level encoding system in which tier level information is impressed on a scrambled television signal in the form of additional short duration, e.g. 2 μs, whiter-than-white tier level coding pulses, also shown at 179 in FIG. 4d. Tier level encoding is achieved by providing a tier level coding pulse in a predetermined horizontal line following the start of a field (preferably in a horizontal line which is not displayed by an image reconstruction device) and in a first predetermined number of successive fields, which are thereafter followed by a second predetermined number of successive fields which have no whiter-than-white tier level coding pulse. For example, to encode a tier level of two, two successive fields will have, in the first scrambled horizontal line following a vertical interval, a whiter-than-white tier pulse. These fields will be followed by additional fields e.g., two, which have no whiter-than-white tier pulse which are then in turn followed by two fields which have the tier pulses. This sequence continually repeats and the descramblers count the number of successive fields which have the tier pulse until the field appear which have no tier pulses. The counted value corresponds to the tier level coding information contained with the scrambled television signal. A descrambler will only operate to unscramble a scrambled television signal if the detected tier level coding information corresponds to the tier level coding assigned to it.

For convenience, and as shown in FIG. 4d, the whiter-than-white tier level coding pulse is placed in the first horizontal scan line following the vertical interval, i.e. in the first horizontal scan line of a field, which is normally not displayed by an image reconstruction device.

Figure 1:
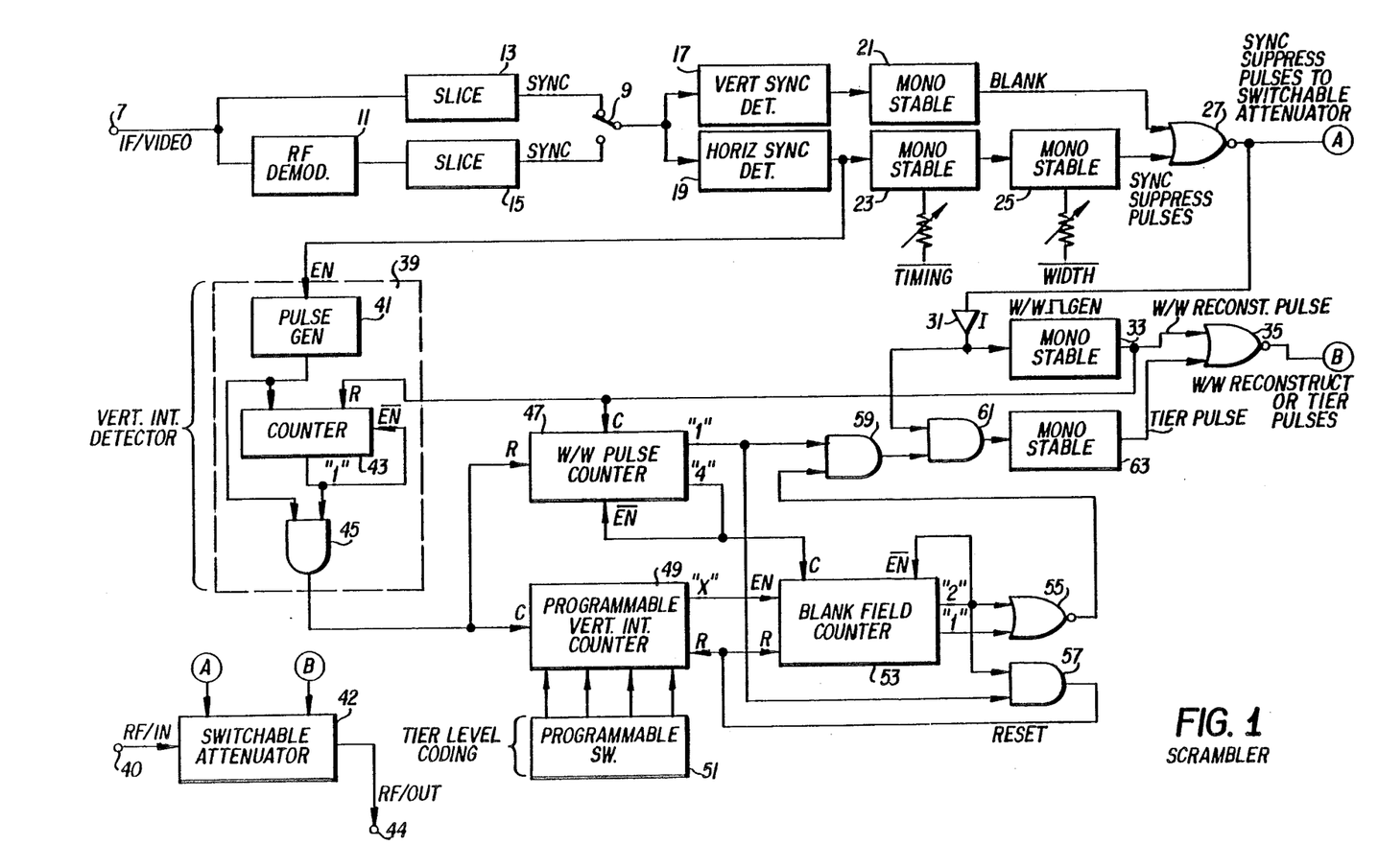
FIG. 1 illustrates the structure and operation of a television signal scrambler constructed in accordance with the teachings of the invention.

Turning to the specifies of the system, FIG. 1 illustrates a scrambler capable of generating the signal waveform illustrated in FIG. 4d. An input terminal 7 receives either an intermediate frequency or baseband video television signal. It is commonly connected to an input of slicing circuit 13 and an input of RF demodulator 11. RF demodulator 11 may be a conventional integrated circuit such as a Signetics TDA 2540. If the input to signal terminal 7 is an input baseband video signal, slice circuit 13 will remove both the horizontal and vertical synchronizing signals therefrom. If the incoming television signal at terminal 7 is an intermediate frequency (IF) signal, RF demodulator 11 will demodulate the incoming signal to baseband video. The output of demodulator 11 passes to slice circuit 15 which, like slice circuit 13, extracts the horizontal and vertical synchronizing signals from the arriving television signal. The output from slice circuit 13 or 15 is selectively passed by switch 9 to the vertical and horizontal synchronization detectors 17 and 19 respectively. These circuits are well known in the art and serve to separate the horizontal synchronizing signals from the vertical synchronizing signals which are present in a television signal. The vertical snyc detector 17 serves to flag the vertical interval between fields on a television signal and the output thereof passes to a monostable multivibrator 21 which develops a "blanking" signal during the period occupied by the vertical synchronizing signals, i.e. during the vertical interval.

The output of the horizontal synchronizing signal detector 19 passes to a monostable multivibrator 23, the output of which is passed to another monostable multivibrator 25. Monostable multivibrators 23 and 25 have adjustable timing periods and respectively generate and set the timing and width of synchronizing signal suppression pulses (hereinafter sync suppression pulses) so they coincide in timing and width with the presence of the horizontal synchronizing signal pulses 173 (FIG. 4a) in an arriving television signal. Typically, the sync suppression pulses will have a width at least equal to that of the horizontal synchronizing pulses 173, but the sync suppression pulse width may be greater. Indeed, if desired, the sync suppression pulse may be as wide as the entire horizontal retrace interval "a" (FIG. 4A). The sync suppression pulses are passed to a NOR gate 27. NOR gate 27 permits the sync suppression pulses to pass whenever a "blanking" signal is not received from the output of monostable multivibrator 21. Accordingly, sync suppression pulses pass through gate 27 at all times except during the presence of a vertical interval. The sync suppression pulses which appera on the ouput of NOR gate 27 pass to a terminal A which is connected to a switchable attenuator 42. Switchable attenuator 42 receives at an input 40, an RF signal version of the television signal which was applied to input 7. Whenever a sync suppression pulse appears at terminal A, the switchable attenuator immediately lowers the amplitude of the signal applied at input terminal 40 by approximately 6 db or more. Since the sync suppression pulses have been timed to coincide with the presence of the horizontal synchronizing pulses in the television signal applied to input 40, switchable attenuator 42 operates to suppress the amplitude of the horizontal synchronizing pulses by approximately 6 db or more for the duration of the applied switching signal so that the television signal applied to RF output terminal 44 of attenuator 42 has the horizontal synchronizing pulses 173 (FIG. 4a) suppressed to an amplitude which is below the "black" level of the amplitude range 181 normally occupied by a picture information signal. Accordingly, the RF output at terminal 44 is an RF television signal which has been scrambled by the suppression of the horizontal synchronizing pulses.

In order to enable a descrambler to reconstruct the suppressed amplitude horizontal synchronizing pulses, timing information is also generated by the scrambler in the form of whiter-than-white pulses which cue the descrambler, enabling it to properly reconstruct the suppressed amplitude horizontal synchronizing pulses in the scrambled television signal. To generate the whiter-than-white timing pulses, an inverter 31 receives each sync suppression pulse applied to terminal A and after inversion applied it to a monostable multivibrator 33 which is adjusted to provide a pulse output having a pulse width of approximately two microseconds (2 µs). Monostable multivibrator 33 acts as a whiter-than-white pulse generator as its output is applied through NOR gate 35 to a terminal B which is another input to switchable attenuator 42. When a signal is received at terminal B, switchable attenuator 42 attenuates the incoming RF signal by approximately 20 db or more for the duration of the applied switching signal. The effect of a signal applied to terminal B of switchable attenuator 42 is to attenuate the incoming RF signal to appoint where the television signal has an amplitude lower than the white boundary level of the amplitude range 181 of the picture image signal. This effectively generates a whiter-than-white pulse 177 (FIG. 4d) in the scrambled video signal.

As noted, the whiter-than-white pulses are generated by monostable multivibrator 33, which is triggered by the leading edge of the sync suppression pulses. Accordingly, the whiter-than-white pulses which pass through NOR gate 35 to terminal B from monostable multivibrator 33 are timed relative to the generation of the sync suppression pulses which are applied to terminal A of switchable attenuator 42. Accordingly, for each sync suppression pulse which is generated to suppress the amplitude of the horizontal synchronizing signals contained in the television signal, a whiter-than-white pulse is also generated. The whiter-than-white pulse may be placed adjacent to or within the interval of the suppressed amplitude horizontal synchronizing pulse; however it is preferably located on the front porch preceding the suppressed amplitude horizontal synchronizing pulses, as shown in FIG. 4d.

FIG. 4b illustrates the sync suppression pulses 175 which are generated at the output of monostable multivibrator 25 and which pass through NOR gate 27 to terminal A. FIG. 4c illustrates the pulses produced at the output of monostable multivibrator 33 which generate the whiter-than-white sync reconstruction pulses, shown in FIG. 4d.

Figure 5:
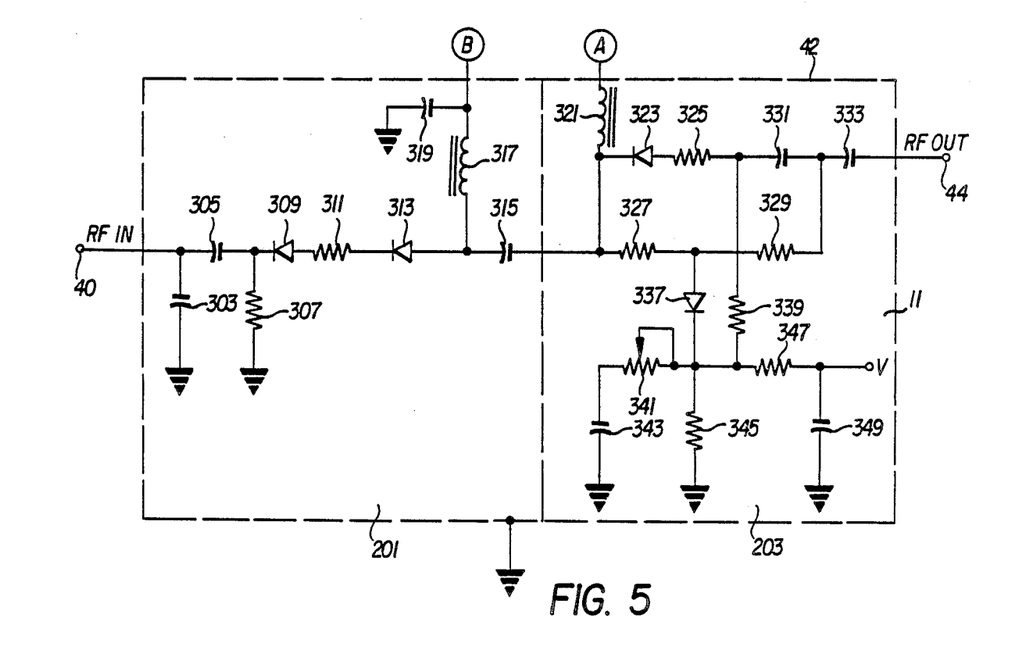

FIG. 5 illustrates the details of a representative switchable attenuator 42 which performs as described above. The switchable attenuator is a series connection of two separate switchable attenuators, the first 201 attenuating an applied RF video signal by approximately 20 db or more when a switching signal is present at terminal B, and the second 203 attenuating an applied RF signal by approximately 6 db or more when a switching signal is present at terminal A. An RF television signal is applied to terminal 40, which is connected to capacitor 303 which serves to match impedance with the output of an RF processor. The applied television signal passes through DC blocking capacitor 305 and to a first side of a switching network formed of diodes 309, 313 and resistor 311. A resistor 307 connects the first side of the switching network to ground and the second side of the switching network is connected to an RF blocking choke 317 and to a D.C. blocking capacitor 315. The RF choke 317 is also connected to input terminal B and to ground through capacitor 319. When a switching signal is applied to terminal B to bias diodes 309 and 313 to a substantially off condition an attenuation of approximately 20 db or more is applied to the television signal passing therethrough. When the diodes are biased by the switching signal to an on condition, there is substantially no attenuation to the television signal.

The output of attenuator 201 is serially connected to the input of attentuator 203 through D.C. blocking capacitor 315. In attenuator 203 the RF television signal can take two different paths, one through resistors 327 and 329 and the other through diode 323, resistor 325 and D.C. blocking capacitor 331. The two RF signal paths are commonly connected at their outputs to the input of a D.C. blocking capacitor 333 which is connected to output terminal 44. The RF input to attenuator 203 is also connected to an RF blocking choke 321 which is connected to terminal A. The common connection of resistors 327 and 329 is connected through diode 337 to resistor 345 which is connected to ground, so that resistors 327, 329 and 345 form a Bridge T attenuation network. A resistor 339 is connected to the common connection of resistor 325 and capacitor 331 and serves to provide a biasing for diode 323. Resistor 339 is connected to a voltage source through a resistor 347, and an AC bypass capacitor 349 is also connected to the voltage source. A resistor 341 and capacitor 343, connected in series, are in turn connected in parallel across resistor 345.

In operation, the RF signal path containing diode 323 serves as a minimum loss path through which the RF television signal passes when the switching signal applied to terminal A biases diode 323 on. When the switching signal applied to terminal A biases diode 323 off, the RF signal passes through the Bridge T network formed by resistors 327, 329 and 345 where it is attenuated by approximately 6 db or more.

The scrambler apparatus as just described is complete in that more of the other circuits of FIG. 1, yet to be described, are required to obtain scrambling of the television signal. However, as described earlier, the invention may be used in connection with a tier level coding scheme whereby certain scramblers can be identified and, only those scramblers having a proper identification, rendered operative to descramble an incoming scrambled television signal. The structures in FIG. 1 for impressing tier level coding information in predetermined fields of the scrambled television signal will now be described.

The scrambler includes a vertical interval detector 39 which is used to determine the beginning of a field. The vertical interval detector includes a pulse generator 41 which emits a pulse whenever horizontal synchronizing pulses disappear from the output of horizontal synchronizing signal detector 19, a counter 43 for counting the pulse output from pulse generator 41, and an AND gate 45 having one input connected to the output of pulse generator 41 and another input connected to the output of a decimal "1" counting stage of counter 43. The decimal "1" output of counter 43 is also provided as a disabling input to counter 43. Counter 43 also receives as a reset signal the timing pulses generated at the output of monostable multivibrator 33.

During the occurrence of a vertical interval, pulse generator 41 will sense the absence of pulses at the output of horizontal synchronization signal detector 19 which will cause the pulse generator 41 to commence emitting a plurality of clock pulses. The first clock pulse which is generated by pulse generator 41 is applied as an input to AND gate 45 and to counter 43 which counts to a decimal "1" state. Before counter 43 counts to the decimal "1" state, it is in a decimal "0" state which enables gate 45 to pass the first output pulse from pulse generator 41. When counter 43 counts to the decimal "1" state it disables itself from counting any further pulses and also blocks gate 45 so that no further pulses from the output of pulse generator 43 are emitted from gate 45. The vertical interval detector 39 thus functions to provide a single output pulse upon the detection of each vertical interval in a television signal applied to input terminal 7. After a vertical interval is identified by vertical interval detector 39, it is reset (counter 43 reset) by the next pulse which occurs from monostable multivibrator 33 during hte first horizontal scan line following the vertical interval. Since horizontal synchronization detection signals are being emitted by detector 19 when this pulse occurs, pulse generator 41 is disabled and does not provide any output pulses.

The pulse output from vertical interval detector 39 is applied to a progammable vertical interval counter 49 as a counting input and as a reset input to a timing pulse counter 47. The timing pulse counter 47 also recieves at a counting input the output of monostable multivibrator 33, so that after being reset, pulse counter 47 counts the number of timing pulses emitted by monostable multivibrator 33. Pulse counter 47 generates an output on its decimal "1" output line after counting the first whiterthan-white pulse emitted following a detected vertical interval. Subsequent timing pulses which are emitted by monostable multivibrator 33 during each field are also counted and when pulse counter 47 reaches a decimal count of "4" in each field it is self-disabled and prevented from counting any further pulses until being reset by the output of the vertical interval detector 39 which precedes the next field. Pulse counter 47, when counting to a decimal "1" value, applies this output to AND gate 59 which passes this pulse as a tier pulse, exept when disabled by the output of NOR gate 55. the tier pulse output of gate 59 is applied to a first input of AND gate 61. AND gate 61 receives at a second input the output of inverter 31 and operates to allow the tier pulse from gate 59 to pass therethrough whenever the ouput of invertor 31 reverts to its rest state after the generation of a sync suppression pulse. Stated otherwise, gate 61 passes the tier pulse from the output of gate 59 after the sync suppression pulse applied to terminal A disappears. This allows the tier pulse to pass to the input of monostable multivibrator 63 which sets a tier pulse width of, for example, two microseconds (2 μs). The tier pulse at the output of monostable multivibrator 63 is applied through NOR gate 35 to terminal B where it is applied to switchable attenuator 42 to attenuate the RF television signal applied thereto by approximately 20 db or more to a whiter-than-white level, as in the case of the timing pulses for reconstruction of the suppressed amplitude horizontal synchronizing signals. This causes a whiter-than-white tier pulse to be impressed on the RF television signal passing through attenuator 42. This tier pulse, which follows the first suppressed amplitude horizontal synchronizing pulse in a field, is illustrated as 179 in FIG. 4.

As noted above, tier pulse coding is achieved by providing a first predetermined number of successive fields of the television signal with a tier pulse, and a second following predetermined number of successive fields with no tier pulse. As exemplary, the scrambler illustrated in FIG. 1 is capable of selecting and encoding any tier level between 1 and 15 so that for a level 15 encoding, 15 successive fields would contain a tier pulse followed by a predetermined number of fields, e.g. two, having no tier pulse, followed by 15 fields containing a tier pulse, etc.

For the purpose of simplifying description, the number of blank fields, that is fields containing no tier pulses is chosen as 2. The control of generating tier pulses in the first predetermined number of fields and then blanking two following fields is accomplished by the programmable vertical interval counter 49, blank field counter 53, and associated gates 55 and 57 (FIG. 1).

Tier level coding information is set as a variable "X" (e.g. 1–15) by a programming switch 51 into programmable vertical interval counter 49. Vertical interval counter 49 counts the pulses emitted by vertical interval detector 39 at the occurrence of each vertical interval. When it reaches a count of "X" corresponding to the tier level coding programmed therein, it enables blank field counter 53. Until the blank field counter 53 is enabled, each pulse emitted when pulse counter 47 counts to a decimal count of "1" in each field passes through AND gate 59 as a tier level coding pulse. When enabled after vertical interval counter 49 counts "X" fields, blank field counter 53 receives at its counting inputs the decimal count "4" output from pulse counter 47. Since pulse counter 47 counts to the decimal value of "4" once following each vertical interval (after being reset by the output of vertical interval detector 39), blank field counter 53 will receive a decimal count of "4" from the output of pulse counter 47 once during each field, enabling the blank field counter 53 to count fields. When blank field counter 53 counts to a decimal value of "1" it provides a disabling signal through NOR gate 55 which disables AND gate 59 so that any tier coding pulses generated by pulse counter 47 counting to a decimal "1" value are prevented from passing through AND gate 59. This effectively blocks the generation of any tier pulses. When the next field is detected, by the output of pulse counter 47 again being cycled through to its decimal "4" output, the blank field counter 53 is incremented to its decimal "2" output which again passes through NOR gate 55 to continue to disable AND gate 59 so that no tier pulse outputs from the decimal "1" output of pulse counter 47 pass. The decimal "2" output of blank field counter 53 also functions to disable this counter. As a consequence, AND gate 59 continues to remain disabled until blank field counter 53 is reset. AND gate 57 detects the decimal count "2" output of blank field counter 53 and whenever this output state is present and the next timing pulse from monostable multivibrator 33 is present following a vertical interval, as detected by pulse counter 47 supplying a pulse on its decimal output "1", gate 57 operates to reset blank field counter 53 and programmable vertical interval counter 49. Thus, the vertical interval counter 49 and blank field counter 53 cooperate with the timing pulse counter 47 to generate a tier coding pulse at the output of gate 59 for a predetermined number of fields as set by the value "X" in programming switch 51, following which will occur two blank fields, as determined by counter 53, during which no tier pulses are generated at the output of gate 59. Following this, the entire system is reset by gate 57 so that the next predetermined number of fields set by the value "X" will again contain a tier pulse.

FIG. 4d illustrates the scrambled television signal obtained by the scrambler of FIG. 1 which appears at the output of switchable attenuator 42. As shown therein, the horizontal synchronizing pulses 173 have a suppressed amplitude so that the amplitude level thereof falls below the "black" level of the image information signal. In addition, the scrambled television signal also includes whiter-than-white reconstruction timing pulses 177 which occur on the front porch of each suppressed amplitude horizontal synchronizing pulse in each horizontal scan line. In addition, the first horizontal scan line at the start of a field further includes a tier level coding pulse 179. FIG. 4b illustrates the sync suppression pulses applied to terminal A of attenuator 42, while FIG. 4c illustrates the pulses produced at terminal B of attenuator 43 which produces the whiter-than-white timing reconstruction and tier pulses illustrated in FIG. 4d.

Although a scrambler has been described in which tier pulses are generated as the second whiter-than-white pulse after a vertical interval (FIG. 4d), it should be clear that the whiter-than-white tier pulse may occur elsewhere in a field. In addition, it should be noted that although the whiter-than-white reconstruction timing signals and whiter-than-white tier pulses are illustrated as relatively narrow pulses, the actual width and timing of the pulses can be varied without departing from the spirit or scope of the invention.

Figure 2:
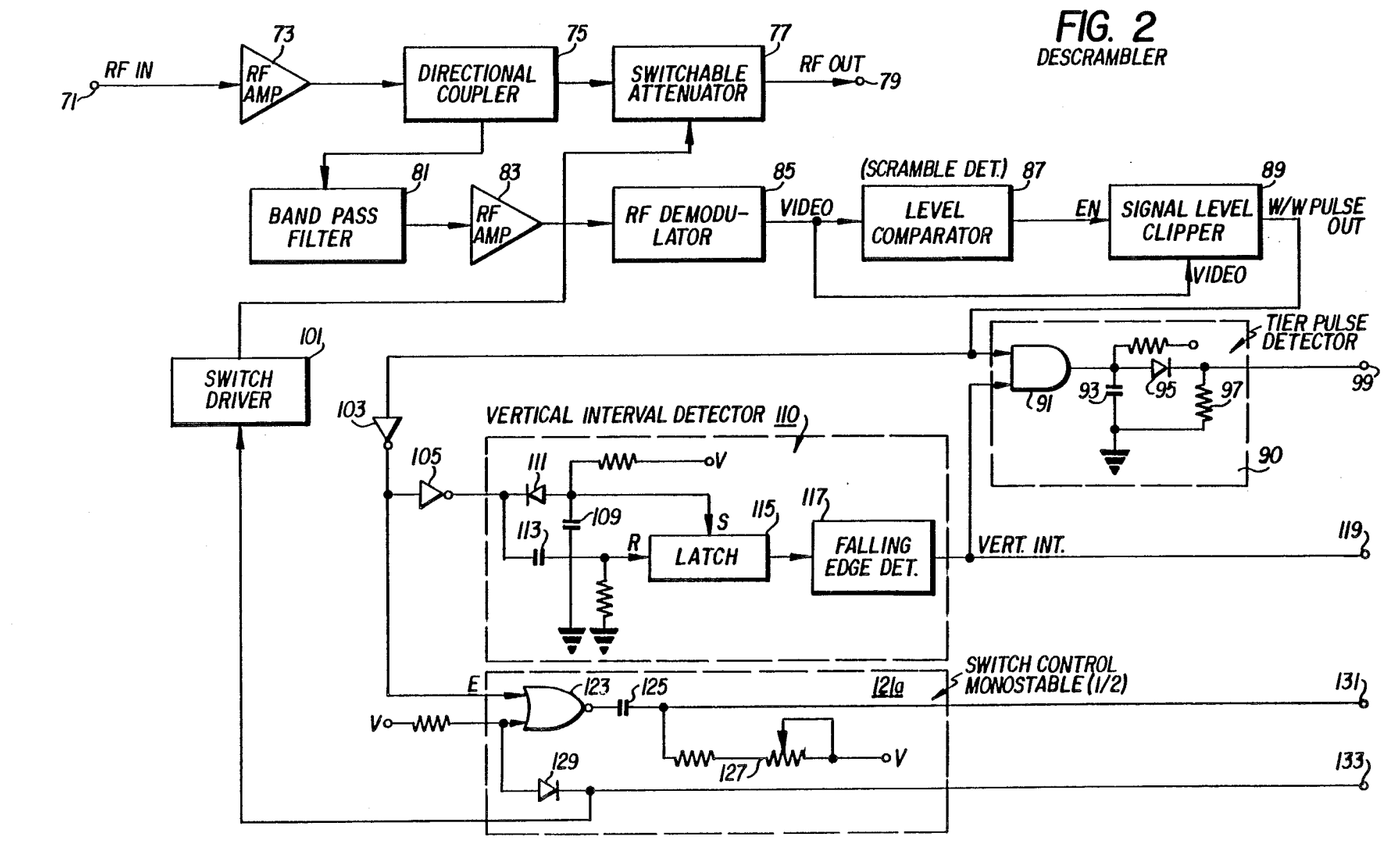
FIG. 2 illustrates the structure and operation of a first portion of a television signal descrambler constructed in accordance with the teachings of the invention.
Figure 3:
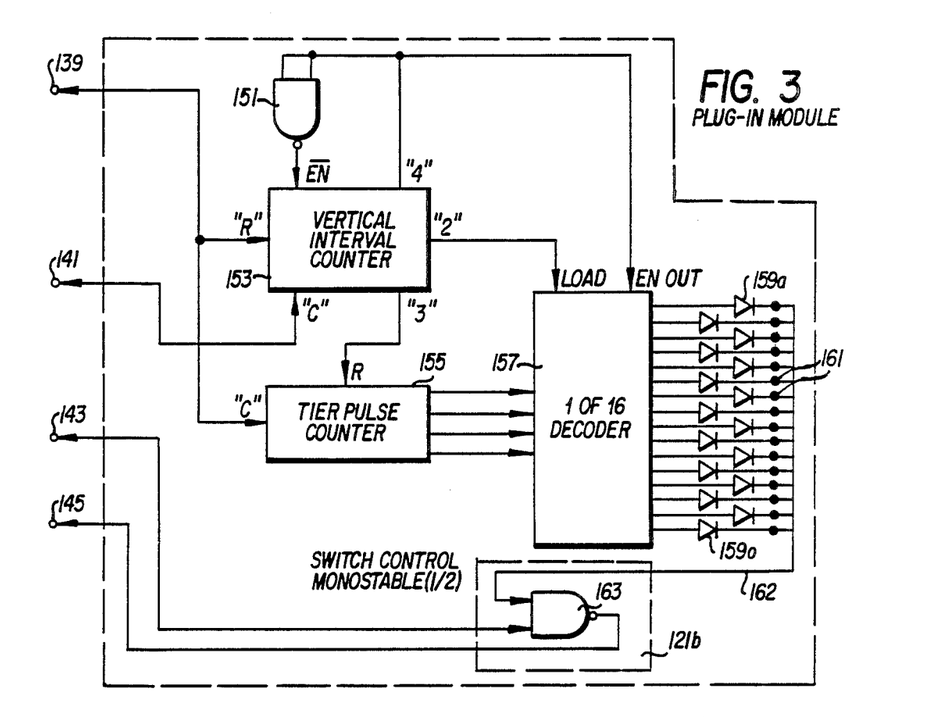
FIG. 3 illustrates the structure and operation of a second portion of a television signal descrambler constructed in accordance with the teachings of the invention.

A descrambler for unscrambling the scrambled television signal illustrated in FIG. 4d will now be described with reference to FIGS. 2 and 3. FIG. 3 illustrates a portion of the descrambler which is preferably configured as a programmable plug-in module for connection with the remainder of the descrambler circuitry which is illustrated in FIG. 2.

A received scrambled television signal having the signal waveform illustrated in FIG. 4d is applied at an input terminal 71 as an RF signal. The applied signal is amplified by RF amplifier 73 and is then applied to a directional coupler 75 which effectively splits the incoming scrambled television signal so that it can be simultaneously applied to the input of switchable attenuator 77 and bandpass filter 81. A typical directional coupler which can be used is illustrated in U.S. Pat. No. 4,311,974, assigned to the same assignee as the present invention. One output of directional coupler 75 is applied to a bandpass filter 81 which is tuned to the channel occupied by the scrambled television signal. The output of bandpass filter 81 is applied to a radio frequency amplifier 83 and is then applied to a radio frequency demodulator 85. Demodulator 85 may be a conventional integrated circuit RF demodulator such as the Signetics TDA 2540 described above.

The baseband video signal output from RF demodulator 85 is applied to the input of level comparator 87 and also to the input of a signal level clipper 89. Level comparator 87 functions as a "scrambler" detector and provides an output whenever it detects that the video signal exiting demodulator 85 has been scrambled. When the above described integrated circuit is used as demodulator 85, a characteristic thereof is that the video signal level output during a vertical interval is at a different level during scrambling than when the demodulator 85 demodulates an unscrambled television signal. Accordingly, level comparator 87 detects the different amplitude of the video signal which occurs upon scrambling and provides an enabling signal to signal level clipper 89 which functions to clip the whiter-than-white pulses from the video signal. As note above, these pulses are either timing pulses for reconstructing the suppressed amplitude horizontal synchronizing signals contained in a scrambled television signal of the tier level coding pulses. The whiter-than-white pulse output from signal level clipper 89 is applied to one input of a tier pule detector 90 formed by AND gate 91, capacitor 93, diode 95 and resistor 97. The output of tier pulse detector 90 is applied to a terminal 99 which is connected to the plug-in module (FIG. 3).

The whiter-than-white pulses obtained at the output of signal level clipper 89 are also applied through inverter 103 nd inverter 105 to a vertical interval detector 110 formed by dioe 111, capacitor 109, capacitor 113, latch circuit 115 and falling edge detector circuit 117. Vertical interval detector 110 receives each whiter-than-white pulse in a scrambled television signal and at the occurrence of each such pulse discharges capacitor 109 through diode 111. The continued discharge of capacitor 109 by the arriveing whiter-than-white pulses prevents the capacitor from charging to a sufficient voltage to set latch 115. In addition, the arriving whiter-than-white pulses also pass via capacitor 113 to the reset input of latch 115 to hold latch 115 in a reset state. Upon the disapperaance of the whiter-than-white pulses during the vertical interval, capacitor 109 charges to a voltage sufficient to set latch 115, so that latch 115 is set during the vertical interval. After the occurrence of the vertical interval and at the first whiter-than-white pulse which occurs thereafter, latch 115 is again reset. When latch 115 is reset, the falling signal level at the output thereof is sensed by falling edge detector 117 to identify the end of the vertical interval, but this occurs only after a first whiter-than-white pulse has been detected in the first horizontal scan line of a field following the vertical interval. The vertical interval detection signal at the output of detector 110 is applied to AND gate 91 to enable the same so that the second whiter-than-white pulse which occurs in a field, which is the tier coding pulse, actuates AND gate 91. Capacitor 93 is normally discharged by the non-enabled output of AND gate 91, but whenever AND gate 91 is enabled, by the detection of the end of a vertical interval by detector 110 and the appearance of the next following whiter-than-white pulse, capacitor 93 is allowed to charge to a voltage sufficient to turn on diode 95 which generates an output at terminal indicating detection of a tier coding pulse. It will be remembered, as illustrated in FIG. 4d, that the second whiter-than-white pulse following the beginning of a field is the tier pulse and this is the pulse which is regenerated at terminal 99 by tier pulse detector 90.

The whiter-than-white pulse output from signal level clipper 89 is also applied through inverter 103 to one enabling input of a switch control monostable multivibrator 121 which is divided in two, one half (121a)

being provided in the descrambler circuit illustrated in FIG. 2, and the other half (121b) being provided in the plug-in module of FIG. 3. The switch control monostable 121 generates an output pulse for each occurrence of a whiter-than-white pulse from inverter 103. This output pulse is applied to a switch driver 101 which operates a switchable attenuator 77 to attenuate the arriving scrambled television signal, by approximately 6 db or more except at the locations of the suppressed amplitude horizontal synchronizing signals, thus effectively boosting the amplitude of the horizontal synchronizing signals by approximately 6 db or more relative to the remainder of the arriving television signal. Thus, switchable attenuator 77, which receives a scrambled RF television signal from coupler 75, provides at its RF output an unscrambled RF television signal. An exemplary circuit for switchable attenuator 77 is shown as attentuator portion 203 in FIG. 5.

Switch control monostable 121a generates an output pulse having a width equal to that of the suppressed amplitude horizontal synchronizing signals, as set by the RF timing circuit comprising capacitor 125 and resistors 127, but can only generate its output signal when further enabled by the presense of a signal at the output of one of sixteen decoder 157 (FIG. 3). The output of decoder 157 is provided as an enabling input to one input of NAND gate 163 which comprises the other half (121b) of the switch control monostable multivibrator. NAND gate 163 has at its other input, an output signal taken through capacitor 125 from the output of NOR gate 123. The output of NAND gate 163 is supplied as an input signal which is applied to switch driver 101. Since switch control monostable 121 is only enabled when an output is present at one of the output lines of decoder 157, switch control monostable 121 will remain disabled and not generate control signals for switch driver 101 until the descrambler first determines it is entitled to descramble the arriving scrambled television signal. This is accomplished by detecting the tier level coding information contained in the scrambled television signal and comparing it with the tier level coding assigned to and programmed in the descrambler.

To determine the tier level coding information contained in an arriving television signal, the descrambler incorporates, within the plug-in module (FIG. 3), a vertical interval counter 153, a tier pulse counter 155, a disabling gate 151, a one of sixteen decoder 157, and a diode array 159a . . . 159o in addition to one-half of switch control monostable (121b).

Vertical interval counter 153 receives at its counting input the output of vertical interval detector 110 (FIG. 2). Whenever vertical interval counter counts to a decimal value of "2" it loads one-of-sixteen decoder 157 with the output of tier pulse counter 155. Whenever vertical interval counter 153 reaches a decimal count value of "3" it resets the tier pulse counter 155, and whenever it reaches a decimal count value of "4" it disables itself through NAND gate 151 and resets all the outputs of decoder 157 to a "o" state. The vertical interval counter 153 remains disabled until reset by a tier pulse applied from the output of tier pulse detector 90. The output of tier pulse detector 90 is also applied to the count input of tier pulse counter 155. With this arrangement, each detection of a tier pulse by detector 90 is counted in tier pulse counter 155. The detected tier pulse also causes the vertical interval counter 153 to be reset. On the occurrence of the next vertical counter 153 determined by vertical interval detector 110, the vertical interval counter is increment to a decimal count value of "1". However, the next tier pulse which occurs in the field immediately following the vertical interval will reset the vertical interval counter to a decimal count value of "0" while incrementing the tier pulse counter 155. In this manner, the tier pulse counter 155 is continually incremented as tier pulses are detected in successive fields, while the vertical interval counter continually counts to a decimal value of "1" and is then reset in each field. This operation repeats until a field occurs which does not have a tier pulse, at which time the vertical interval counter now counts to a decimal value of "2" as it is not reset, because of the absence of a tier pulse. When the vertical interval counter 153 counts to a decimal value of "2" the one of sixteen decoder 157 is instructed to load the contents of the tier pulse counter 155 therein. At this time tier pulse counter 155 contains, in binary form, a decimal value correponding to the number of preceding successive fields which had a tier pulse therein. One of sixteen decoder then decodes the decimal value loaded therein and turns on one of the diodes in diode array 159a . . . 159o thereby activating an output line corresponding to the decimal count contained in the tier pulse counter 155. Diodes 159a . . . 159o are all wired to a common output which is connected to the input of NAND gate 163 so that whenever any one of the diode outputs is activated NAND gate 163 is enabled, thus enabling switch control monostable 121 so that subsequent whiter-than-white pulses applied to the input of NOR gate 123 cause the switch control monostable to generate the control pulses which activate switch driver 101 and operate switchable attenuator 77 to reconstruct the suppressed amplitude horizontal synchronizing pulses in the scrambled television signal.

Upon the occurrence of the next vertical interval (that preceding the second field containing no tier pulse) the vertical interval counter 153 counts to a decimal "3" value which causes the vertical interval counter 153 to reset tier pulse counter 155 and begin another counting sequence.

Under normal operation, counter 153 will count to a decimal value of "3" whereupon it will be reset by the next incoming tier pulse. However, if this next tier pulse does not occur, indicating an error, counter 153 will then count to a decimal value of "4". This occurs at the next vertical interval. At this point, the output at the diode array 159a . . . 159o disappears as counter 153 resets the decoder 157 to an all "o" output state by disabling the decoder 153 output, thereby in turn disabling monostable 121. Counter 153 is also self-disabled by NAND gate 151, which senses the count value of "4", and remains disabled until it is reset by the next arriving tier coding pulse. If a tier coding pulse subsequently occurs in the next field, counter 153 then resets and the entire process of detecting and decoding tier level coding information repeats.

Programming of a tier level in the descramblers is accomplished by drilling through certain predetermined drill points 161 of the plug-in module (FIG. 3) thereby interrupting the connection paths from one or more diodes 159a . . . 159o to the enabling input of NAND gate 163. Thus, if a tier level of 7 is desired for a particular descrambler, the connection points of the diodes to line 162 corresponding to decoder outputs of 8 and above and 6 of below are severed by drilling through the appropriate diode connection points 161. The programming of a descrambler is produced by having the appropriate diode(s) of the array 159a . . . 159o, corresponding to one or more tier levels, connected to the enabling input line 162 of NAND gate 163 after the drilling operation.

The plug-in module illustrated in FIG. 3 is preferably encapsulated in epoxy or other suitable encapsulation material and the drill points 161 are preferably embedded within the encapsulated module with the locations thereof being indicated on an external surface of the module.

Although the descrambler of the invention has been described in connection with a tier level coding scheme, it should be appreciated that the descrambler can be used without it. In this case the plug-in module structures (FIG. 3) can be eliminated except for NAND gate 163, with the enabling input to NAND gate 163 being permanently held "high" by a biasing circuit. With this arrangment whiter-than-white pulses passing through the signal lever clipper 89 and invertor 103 will cause switch control monostable 121a to generate the appropriate control signal to operate switch driver 101 to regenerate the suppressed amplitude horizontal synchronizing signal by means of switchable attenuator 77. If tier level coding is not employed in the descrambler, then tier pulse detector 90 and vertical interval detector 110 may likewise be omitted.

As will be appreciated by those skilled in the art, the invention has applicability to television signals of various formats. For example, the invention may be used with baseband composite video signals, or with amplitude modulated radio frequency carriers containing modulation components which include composite baseband video signals, and one or more of audio subcarrier signals, color subcarriers, vertical interval test signals (VITS), and video text or other special data, or with vestigial sideband amplitude modulated radio carriers containing composite baseband video signals and one or more of the modulation components just described, or with other television signal formats. The radio frequency carrier may be frequencies assigned for broadcast, cable transmission, satellite or microwave transmission as well as intermediate frequencies used in television signal processing. All of the various formats a television signal may take can be used in connection with the invention.

Although the invention has been illustrated with respect to particular structures, it should be apparent that many modifications can be made thereto without departing from the spirit or scope of the invention. Accordingly, the invention is not limited by the foregoing description but is only limited by the claims which are appended hereto.

What is claimed is:

1. An apparatus for scrambling a television signal containing horizontal and vertical synchronizing signals and image information signals, said apparatus comprising:
    means for receiving said television signal;
    a first detector for deriving horizontal synchronizing signals from said television signal;
    first signal generating means responsive to the output of said first detector for generating horizontal sync suppression pulses at times corresponding to the occurrence of horizontal synchronizing signals in said television signal;
    second signal generating means responsive to the output of said first detector for generating timing pulses which are related in time to said horizontal sync suppression pulses;
    switchable means responsive to the output of said first and second signal generating means for selectively forcing the amplitude of said television signal to a first predetermined level upon the occurrence of said horizontal sync suppression pulses, and for selectively forcing the amplitude of said television signal to a second predetermined whiter-than-white level upon the occurrence of said timing pulses.

2. An apparatus as in claim 1 wherein said first level is within an amplitude range normally occupied by said image information signals.

3. An apparatus as in claims 1 or 2 wherein said switchable means force the amplitude of said television signal to said first predetermined level for the duration of each said horizontal sync suppression pulse.

4. An apparatus as in claims 1 or 2 wherein said switchable means forces the amplitude of said television signal to said second predetermined level for the duration of each said timing pulse.

5. An apparatus as in claims 1 or 2 wherein said switchable means is a switchable attenuator.

6. An apparatus as in claim 5 wherein said switchable attenuator attenuates said television signal by approximately 6 db or more in response to said horizontal sync suppression pulses.

7. An apparatus as in claim 5 wherein said switchable attenuator attenuates said television signal by approximately 20 db or more in response to said timing pulses.

8. An apparatus as in claims 1 or 2 further comprising a second detector for deriving vertical synchronizing signals from said television signal, and means responsive to the output of said second detector for preventing the generation of said horizontal sync suppression pulse during the occurrences of said vertical synchronizing signals in said television signal.

9. An apparatus as in claims 1 or 2 wherein said horizontal sync suppression pulses have a width equal to or greater than the width of said horizontal synchronizing signals in said television signal.

10. An apparatus as in claim 4 wherein said timing pulses have a width which is less than that of said horizontal synchronizing signals in said television signal.

11. An apparatus as in claim 10 wherein said timing pulses have a width of approximately 2 micro seconds.

12. An apparatus as in claim 8 wherein said preventing means comprises means for generating a blanking signal during the occurrence of said vertical synchronizing signals and a gate means connected to the output of said blanking signal generating means for blocking the passage of said horizontal sync suppression pulses to said switchable means upon the generation of said blanking signal.

13. An apparatus as in claim 1 wherein said second signal generating means includes a pulse generator which generates a timing pulse upon the occurrence of each horizontal sync suppression pulse.

14. An apparatus as in claims 1 or 2 wherein the amplitude of said television signal is forced to said second predetermined level during an interval corresponding to a front porch which precedes each said horizontal synchronizing signal.

15. An apparatus for descrambling a scrambled television signal containing image information signals, vertical snychronizing signals, suppressed amplitude horizontal synchronizing signals, and horizontal synchronizing reconstruction signals in the form of whiter-than-white pulses in said television signal, said apparatus comprising:
 means for receiving said television signal;
 switchable means for selectively boosting the amplitude of said suppressed amplitude horizontal synchronizing signals relative to the remainder of said television signal;
 means for deriving said whiter-than-white pulses from said television signal;
 means responsive to said deriving means for generating a pulsed control signal in response to said detected whiter-than-white pulses and for selectively operating said switchable means with said pulsed control signal to boost said suppressed amplitude horizontal synchronizing signals relative to the remainder of said television signal.

16. An apparatus as in claim 15 wherein said whiter-than-white pulses are located in or adjacent an interval occupied by said suppressed amplitude horizontal synchronizing signals.

17. An apparatus as in claim 16 wherein each said whiter-than-white pulse is located on a front porch which precedes a respective suppressed amplitude horizontal synchronizing signal.

18. An apparatus as in claim 15 wherein said switchable means is a switched signal attenuator.

19. An apparatus as in claim 18 wherein said switchable attenuator is operated by said pulsed control signal to attenuate a received said television signal by approximately 6 db or more except at the intervals corresponding to said suppressed amplitude horizontal synchronizing signals.

20. An apparatus as in claim 16 wherein the pulses of said pulsed control signal has a width corresponding to the width of the interval occupied by the said suppressed amplitude horizontal synchronizing signals.

21. An apparatus as in claim 15 wherein said generating means includes a monostable multivibrator which generates said pulsed control signal.

22. A method for scrambling a television signal containing horizontal and vertical synchronizing signals and image information signals, said method comprising the steps of:
 receiving said television signal;
 deriving vertical synchronizing signals from said television signal;
 deriving horizontal synchronizing signals from said television signal;
 generating horizontal sync suppression pulses at times corresponding to the occurrence of horizontal synchronization signals in said television signal;
 generating timing pulses which are related in time to said horizontal sync suppression pulses;
 selectively forcing the amplitude of said television signal to a first predetermined level upon the occurrence of said horizontal sync suppression pulses, and forcing the amplitude of said television signal to a second predetermined whiter-than-white level upon the occurrence of said timing pulses.

23. A method as in claim 22 wherein said first level is within an amplitude range normally occupied by said image information signals.

24. A method as in claim 23 wherein the amplitude of said television signal is forced to said first predetermined level for the duration of said horizontal sync suppression pulses.

25. A method as in claims 23 or 24 wherein the amplitude of said television signal is forced to said second predetermined level for the duration of said timing pulses.

26. A method as in claims 22 or 23 wherein said television signal is attenuated upon the occurrence of said horizontal sync suppression pulses and said timing pulses.

27. A method as in claim 26 wherein said television signal is attenuated by approximately 6 db or more in response to said horizontal sync suppression pulses.

28. A method as in claim 26 wherein said television signal is attenuated by approximately 20 db or more in response to said timing pulses.

29. A method as in claim 22 wherein the generation of said horizontal sync suppression pulses is prevented during the occurrence of said vertical synchronizing signals in said television signal.

30. A method as in claim 26 wherein said horizontal sync suppression pulses have a width equal to or greater than the width of said horizontal synchronizing signals in said television signal.

31. A method as in claim 25 wherein said timing pulses have a width which is less than that of said horizontal synchronizing signals in said television signal.

32. A method as in claim 31 wherein said timing pulses have a width of approximately 2 micro seconds.

33. A method as in claims 22 or 23 wherein the amplitude of said television signal is forced to said second predetermined level during an interval corresponding to a front porch which precedes each said horizontal synchronizing signal.

34. A method for descrambling a scrambled television signal containing image information signals, vertical synchronizing signals, suppressed amplitude horizontal synchronizing signals, and horizontal synchronizing reconstruction signals in the form of whiter-than-white pulses in said television signal, said method comprising the steps of:
 receiving said television signal;
 deriving said whiter-than-white pulses from said television signal;
 generating a pulsed control signal in response to said detected whiter-than-white pulses and using said pulsed control signal to selectively operate a switchable means to boost the amplitude of said suppressed amplitude horizontal synchronizing signals relative to the remainder of said television signal.

35. A method as in claim 34 wherein said whiter-than-white pulses are located in or adjacent an interval occupied by said suppressed amplitude horizontal synchronizing signals.

36. A method as in claim 35 wherein said whiter-than-white pulses are located on a front porch preceding each said suppressed amplitude horizontal synchronizing signal.

37. A method as in claim 35 wherein each said whiter-than-white pulse is approximately 2 micro seconds in width.

38. A method as in claim 34 wherein said switchable means is operated by said pulsed control signal to attenuate a received said television signal by aproximately 6 db or more except at the intervals corresponding to said suppressed amplitude horizontal synchronizing signals.

39. A method as in claim 34 wherein the pulses of said pulsed control signal have a width corresponding to the width of the interval occupied by the said suppressed amplitude horizontal synchronizing signals.

40. An apparatus for scrambling an RF television signal wherein said television signal contains horizontal and vertical synchronizing signals and image information signals, said apparatus comprising:
- means for receiving an RF television signal containing horizontal and vertical synchronizing signals and image information signals;
- a first detector for deriving horizontal synchronizing signals from said television signal;
- first signal generating means responsive to the output of said first detector for generating horizontal sync suppression pulses at times corresponding to the occurrence of horizontal synchronizing signals in said television signal;
- second signal generating means responsive to the output of said first detector for generating timing pulses which are related in time to said horizontal sync suppression pulses; and
- switchable means coupled to receive said RF television signal and responsive to the output of said first and second signal generating means for selectively attenuating the amplitude of said RF television signal so that it is forced to a first predetermined level upon the occurrence of said horizontal sync suppression pulses and forced to a second predetermined whiter-than-white level upon the occurrence of said timing pulses.

41. An apparatus for descrambling a scrambled RF television signal containing image information signals, vertical synchronizing signals, suppressed amplitude horizontal synchronizing signals, and horizontal synchronizing reconstruction signals in the form of whiter-than-white levels in said RF television signal amplitude, said apparatus comprising:
- means for receiving a scrambled RF television signal containing image information signals, vertical synchronizing signals, suppressed amplitude horizontal synchronizing signals, and horizontal synchronizing reconstruction signals in the form of whiter-than-white levels formed in said received RF television signal by attenuating the amplitude of an RF television signal;
- switchable means for selectively attenuating selected portions of said received scrambled RF television signal relative to other portions of said received scrambled RF television signal to boost the amplitude of said suppressed amplitude horizontal synchronizing signals relative to the remainder of said received scrambled RF television signal;
- means for detecting said whiter-than-white levels from said scrambled RF television signal; and
- means responsive to said deriving means for generating a pulsed control signal in response to said detected whiter-than-white levels and for selectively operating said switchable means with said pulsed control signal to boost said suppressed amplitude horizontal synchronizing signals in said scrambled television signal relative to the remainder of said received scrambled RF television signal to provide a descrambled RF television signal.

42. A method for scrambling an RF television signal wherein said television signal contains horizontal and vertical synchronizing signals and image information signals, said method comprising:
- receiving an RF television signal containing horizontal and vertical synchronizing signals and image information signals;
- deriving horizontal synchronizing signals from said television signal;
- generating horizontal sync suppression pulses at times corresponding to the occurrences of said derived horizontal synchronizing signals in said television signal;
- generating timing pulses which are related in time to said horizontal sync suppression pulses; and
- selectively attenuating the amplitude of said RF television signal so that it is forced to a first predetermined level upon the occurrence of said horizontal sync suppression pulses and forced to a second predetermined whiter-than-white level upon the occurrence of said timing pulses.

43. A method for descrambling a scrambled RF television signal containing image information signals, vertical synchronizing signals, suppressed amplitude horizontal synchronizing signals, and horizontal synchronizing reconstruction signals in the form of whiter-than-white levels in said RF television signal amplitude, said method comprising:
- receiving a scrambled RF television signal containing image information signals, vertical synchronizing signals, suppressed amplitude horizontal synchronizing signals, and horizontal synchronizing reconstruction signals in the form of whiter-than-white levels formed in said received RF television signal by attenuating the amplitude of an RF television signal;
- detecting said whiter-than-white levels from said scrambled RF television signal; and
- generating a pulsed control signal in response to said detected whiter-than-white levels for selectively attenuating selected portions of said received scrambled RF television signal relative to other portions of said received scrambled RF television signal to boost the amplitude of said suppressed amplitude horizontal synchronizing signals relative to the remainder of said received scrambled RF television signal in response to said pulsed control signal to provide a descrambled RF television signal.

* * * * *